United States Patent
Kadota

(10) Patent No.: US 6,831,342 B2
(45) Date of Patent: Dec. 14, 2004

(54) OPTICAL DEVICE FOR CONVERTING INCIDENT LIGHT INTO A SECOND HARMONIC

(75) Inventor: Michio Kadota, Kyoto (JP)

(73) Assignee: Murata Manufacturing Co., Ltd., Kyoto (JP)

(*) Notice: Subject to any disclaimer, the term of this patent is extended or adjusted under 35 U.S.C. 154(b) by 73 days.

(21) Appl. No.: 10/211,566

(22) Filed: Aug. 5, 2002

(65) Prior Publication Data

US 2003/0045014 A1 Mar. 6, 2003

(30) Foreign Application Priority Data

Aug. 30, 2001 (JP) ........................................ 2001-261050

(51) Int. Cl.[7] ........................................... H01L 31/0232
(52) U.S. Cl. ..................................................... 257/432
(58) Field of Search ............................. 257/10, 13, 21, 257/79, 80–85, 88, 93, 95, 98, 103, 432, 431, E27.006, E27.119; 438/20, 22, 26, 48, 24, 46, 47, 29, 27

(56) References Cited

U.S. PATENT DOCUMENTS

| | | | |
|---|---|---|---|
| 5,150,447 A | * | 9/1992 | Tamada et al. .............. 385/130 |
| 5,852,702 A | * | 12/1998 | Nishida et al. .............. 385/130 |
| 6,282,357 B1 | * | 8/2001 | Kadota et al. .............. 385/129 |

FOREIGN PATENT DOCUMENTS

| | | | | |
|---|---|---|---|---|
| JP | 812367 | * | 3/1991 | ............. G02F/1/37 |
| JP | 05142438 A | * | 6/1993 | |
| JP | 8-12367 | * | 2/1996 | ............. G02F/1/37 |

OTHER PUBLICATIONS

Jastrzebski, " Electrostriction, .Piezoelectricity, and Ferroelectric", The Natrue and Properties of Engineering Materials, 3rd Edition, pp. 459–464, 1995.*

* cited by examiner

*Primary Examiner*—Craig A. Thompson
(74) *Attorney, Agent, or Firm*—Keating & Bennett, LLP

(57) ABSTRACT

An optical device includes a substrate, dielectric layers disposed on portions of the substrate, and a piezoelectric layer disposed over the substrate and the dielectric layer, wherein the piezoelectric layer functions as a waveguide in which incident light is transmitted parallel to the surface of the piezoelectric layer. The piezoelectric layer has first piezoelectric layer regions each having an axis orientation directed to a first direction depending on the substrate and second piezoelectric layer regions each having an axis orientation directed to a second direction depending on the dielectric layers, and each of the first piezoelectric layer regions and each of the second piezoelectric layer regions are adjacent. A method manufacturing an optical device includes the steps of forming dielectric layers on portions of a substrate, and forming a piezoelectric layer over the dielectric layers and the substrate.

13 Claims, 4 Drawing Sheets

OPTICAL DEVICE FOR CONVERTING INCIDENT LIGHT INTO A SECOND HARMONIC

BACKGROUND OF THE INVENTION

1. Field of the Invention

The present invention relates to an optical device for converting incident light into, for example, a second harmonic and outputs the second harmonic, and also relates to a manufacturing method thereof.

2. Description of the Related Art

Conventionally, the use of short-wavelength semiconductor laser beams in the field of optical recording and playback has been studied to provide high-density recording. Among such studies, optical devices generating a second harmonic are being investigated.

An optical device is disclosed in Japanese Examined Patent Application Publication No. 8-12367 and includes a piezoelectric layer having two types of regions having opposite polarization directions and the regions are arranged alternately in the direction of propagation of incident light.

In a method of manufacturing the above-described optical device, heat is selectively applied to a portion of the piezoelectric layer, which includes $LiNbO_3$, to form the regions having opposite polarization directions.

However, in the conventional optical device, partial heat treatment is expensive and requires a lot of time and the defect rate increases due to difficulty in selectively applying heat with precision.

SUMMARY OF THE INVENTION

In order to overcome the above-described problems, preferred embodiments of the present invention provide an optical device including a substrate, dielectric layers provided on portions of the substrate, a piezoelectric layer provided on the substrate and the dielectric layers, the piezoelectric layer having first regions disposed on the substrate and second regions disposed on the dielectric layers, the first and second regions being adjacent to each other, wherein the piezoelectric layer transmits incident light substantially parallel to the surface of the piezoelectric layer, the first regions have an axis orientation in a first direction caused by the substrate, the second regions have an axis orientation in a second direction caused by the dielectric layers, the first direction is opposite to the second direction.

In the optical device according to this preferred embodiment of the present invention, the substrate preferably includes at least one material selected from the group consisting of c-plane sapphire, a-plane sapphire, m-plane sapphire, negative Z-plane $LiNbO_3$, and negative z-plane $LiTaO_3$, and the dielectric layers includes at least one material selected from the group consisting of $SiO_2$, SiO, SiN, Tin, $BaSiTiO_3$, $Al_2O_3$, TaN, $TiO_2$, and $Ta_2O_3$.

Alternatively, in the optical device according to preferred embodiments of the present invention, the substrate includes at least one material selected from the group consisting of $LiNbO_3$ other than negative Z-plane $LiNbO_3$, $LiTaO_3$ other than negative Z-plane $LiTaO_3$, glass, and quartz crystal, and the dielectric layers include at least one of $SiO_2$ and AlN.

In the optical device, the dielectric layers are preferably made of one of ZnO, $LiNbO_3$, $LiTaO_3$, $KNbO_3$, $Ta_2O_3$, and AlN, and the material of the dielectric layers is preferably different from that of the substrate.

According to the above-described novel configuration, the piezoelectric layer generating a second harmonic is prepared with high reproducibility and at a reduced cost by forming the dielectric layers, wherein the piezoelectric layer has the first and second regions which have opposite orientations and are adjacent to each other.

In the optical device, each of the dielectric layers preferably has a refractive index that is less than that of the piezoelectric layer. In the optical device, the substrate preferably has a refractive index that is less than that of the piezoelectric layer.

According to the above-described configuration, since the piezoelectric layer has a refractive index that is less than that of at least one of the dielectric layers and the substrate, the leakage of light transmitted in the piezoelectric layer is suppressed. Thus, the loss of light is greatly reduced and the efficiency of converting incident light into a second harmonic is greatly increased.

In the optical device, the first and second directions are preferably different. The first and second directions are preferably substantially perpendicular to the direction of propagation of incident light. The first and second regions are preferably arranged alternately and periodically in the direction of propagation of incident light. According to the above-described novel configuration, the efficiency of converting incident light into a second harmonic is greatly increased.

In the optical device, the piezoelectric layer preferably functions as a waveguide generating a second harmonic.

In the optical device, the piezoelectric layer preferably has a flat surface.

According to the above-described configuration, since the piezoelectric layer has a flat surface, the leakage of light transmitted in the piezoelectric layer is prevented and minimized. Thus, the light loss is greatly reduced and the efficiency of converting incident light into a second harmonic is greatly increased.

In addition, in order to overcome the above-described problems, preferred embodiments of the present invention provide a method for manufacturing an optical device including the steps of forming on a substrate dielectric layers to transmit incident light substantially parallel to the surface of the piezoelectric layer, wherein the dielectric layers include first regions having an axis orientation in a first direction and second regions having an axis orientation in a second direction, and the first direction is opposite the second direction, and the first and second regions are adjacent to each other, and forming the dielectric layers which cause a piezoelectric layer to have an axis orientation in a first direction on a portion of the substrate which causes the piezoelectric layer to have an axis orientation in a second direction, and forming the piezoelectric layer on the substrate and dielectric layers.

According to the above-described configuration, the piezoelectric layer generating a second harmonic is prepared with high reproducibility and at reduced cost by forming the dielectric layers, wherein the piezoelectric layer has the first and second regions which have different orientations and are adjacent each other.

The above and other elements, features, and advantages of the present invention will become clear from the following detailed description of the preferred embodiments of the present invention in conjunction with the accompanying drawings.

DETAILED DESCRIPTION OF PREFERRED EMBODIMENTS

The preferred embodiments of the present invention will now be described with reference to the FIGS. 1 to 5.

Figure 1:
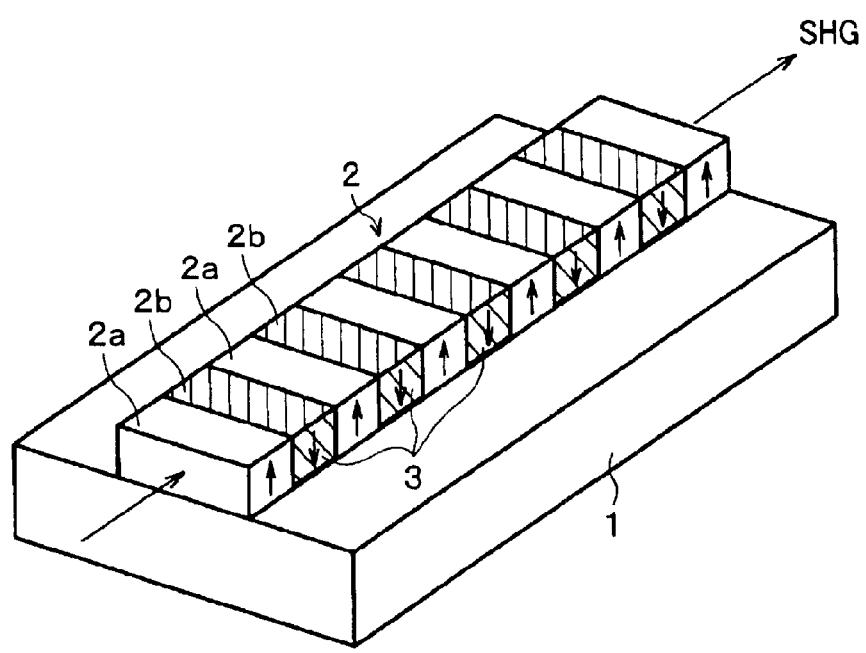
FIG. 1 is a perspective view of an optical device according to a preferred embodiment of the present invention.

Referring to FIG. 1, in an optical device according to a preferred embodiment of the present invention, first piezoelectric layer regions 2a and second piezoelectric layer regions 2b are provided on a substrate 1 including, for example, c-plane sapphire, wherein the first piezoelectric layer regions 2a and the second piezoelectric layer regions 2b are optically transparent, each piezoelectric region 2a and 2b has a substantially rectangular parallelepiped shape, and are alternately arranged adjacent to each other in the direction of propagation of incident light. The first piezoelectric layer regions 2a and the second piezoelectric layer regions 2b have opposite polarization directions (axis orientations), respectively, each includes ZnO, and together define a waveguide (piezoelectric layer) 2.

A first direction is defined as the direction of polarization of the first piezoelectric layer regions 2a and a second direction is defined as the direction of polarization of the second piezoelectric layer regions 2b. The first direction is preferably opposite to the second direction. The first and second directions are preferably substantially perpendicular to a surface of the substrate 1 and are preferably substantially perpendicular to the direction of propagation of incident light. Thus, when the first direction is upward and substantially perpendicular to the surface of the substrate 1, the second direction is downward and substantially perpendicular to the surface of the substrate 1. According to such a structure including the first piezoelectric layer regions 2a and the second piezoelectric layer regions 2b, light incident on the waveguide 2 is converted into a second harmonic and the second harmonic is output.

The first piezoelectric layer regions 2a and the second piezoelectric layer regions 2b preferably have substantially the same width (the length in the direction of propagation of incident light) and are arranged alternately in the direction of propagation of incident light.

Furthermore, in the optical device, individual dielectric layers 3 including $SiO_2$ are disposed between the substrate 1 and each of the second piezoelectric layer regions 2b in order to orient the second piezoelectric layer regions 2b in the second direction. The waveguide 2 preferably has a refractive index greater than those of the substrate 1 and the dielectric layers 3.

Figure 2:
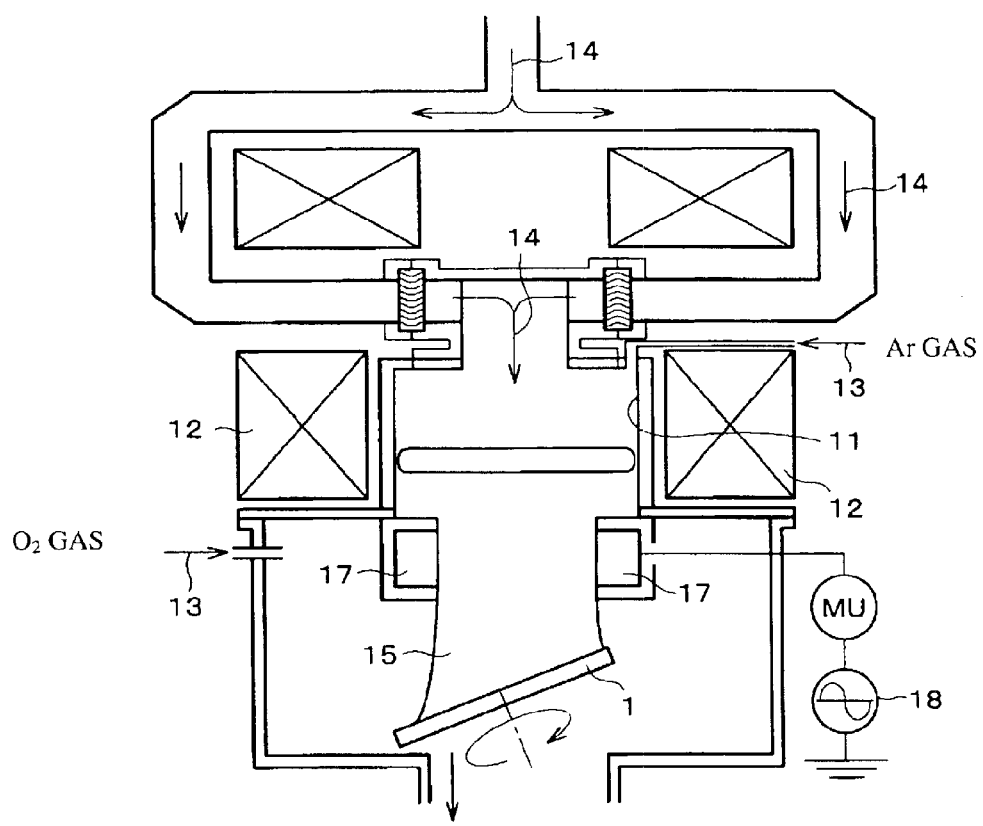
FIG. 2 is an illustration schematically showing the configuration of the optical device.

As shown in FIG. 2, the dielectric layers 3, the first piezoelectric layer regions 2a, and the second piezoelectric layer regions 2b are deposited on the substrate 1 preferably using an ECR sputtering system. The principle of the ECR sputtering system will now be described below. A solid source ECR plasma CVD system made by NTT AFTY Corporation is herein described as an example. The details are described in Amasawa et al, "Formation of High Quality Thin-layer Using ECR Plasma", Journal of the Japan Society for Precision Engineering, 2000, vol. 66, No. 4, pp 511–516.

When microwaves having the same frequency as that of a cyclotron are applied to electrons in cyclotron motion (rotational movement) in a magnetic field, resonance occurs. This is called electron cyclotron resonance (ECR). When using ECR, electrons are efficiently be accelerated to generate high-density plasma.

The deposition process proceeds as follows: a magnetic coil 12 surrounding a plasma chamber 11 generates a magnetic field providing ECR conditions, a gas 13 is introduced into the plasma chamber 11 in this state, microwaves 14 are then applied to generate plasma, and the plasma is then withdrawn from the plasma chamber 11 as a plasma flow 15 to the substrate 1.

This system includes an RF electric field 18 having a frequency of, for example, about 13.56 MHz that is applied to a target 17 which is a solid source provided around the plasma flow 15. Thus, elements released from the solid source by applying the plasma flow 15 and other elements in the plasma flow 15 are deposited on the substrate 1.

When the solid source includes Si and an introduced gas contains Ar and $N_2$, SiN is deposited on the substrate 1. When the gas contains Ar and $O_2$, $SiO_2$ is deposited on the substrate 1. When the solid source includes Zn and the introduced gas contains Ar and $O_2$, ZnO is deposited on the substrate 1.

When an RF sputtering process or a vapor deposition process is used, the substrate must be heated. However, when the ECR sputtering process is used, heating the substrate is not required, as described in this preferred embodiment. A Si solid source is manufactured by slicing a Si single crystal and thus contains substantially no impurities. Accordingly, when such a Si solid source is used, a high purity layer is preferably formed by deposition.

Next, a method for manufacturing an optical device according to a preferred embodiment of the present invention will be described. The substrate 1 preferably including c-plane sapphire is first prepared. The c-plane sapphire has a surface that is substantially perpendicular to the c-axis in a trigonal system. The substrate 1 including the c-plane sapphire is prepared by slicing a sapphire crystal such that the surface is substantially perpendicular to the c-axis or by epitaxially growing a sapphire crystal on a substrate having the axis orientation.

Figure 3:
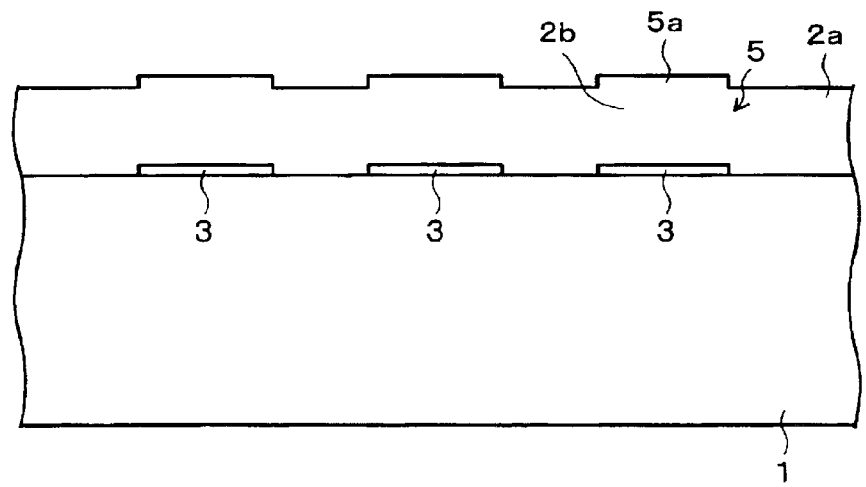
FIG. 3 is an illustration schematically showing a step in a method for manufacturing the optical device according to another preferred embodiment of the present invention.

As shown in FIG. 3, $SiO_2$, which is cubic, is selectively deposited on portions of the substrate 1 so as to form the plurality of dielectric layers 3 each having a thickness of, for example, about 0.2 $\mu$m and a strip shape. The spacing between the dielectric layers 3 is preferably substantially the same as the width thereof and they are arranged substantially parallel with each other. The width direction of the dielectric layers 3 is substantially parallel to the direction of propagation of incident light.

Thus, there are regions covered with the dielectric layers 3 and uncovered regions on the substrate 1, and the covered regions and the uncovered regions are arranged alternately in the direction of propagation of the incident light.

A ZnO layer 5 is deposited over the substrate 1 and the dielectric layers 3 by the ECR process. The deposition conditions of the ECR process include a microwave power of about 450 W and a substrate temperature of approximately 400° C.–500° C. Under such conditions, a ZnO layer having a positive c-plane is formed on the substrate 1. A negative c-plane can be obtained by changing the conditions such as the substrate temperature, the microwave power, the mixing ratio and the flow rate of gases such as Ar and $O_2$, and the bias current applied to the substrate.

In the above-described method, convex portions 5a are formed at the surface of the ZnO layer 5 above the dielectric layers 3. Regions of the ZnO layer 5 on the substrate 1 define the first piezoelectric layer regions 2a and other regions of the ZnO layer 5 on the dielectric layers 3 define the second piezoelectric layer regions 2b, depending on the orientations of the substrate 1 and the dielectric layers 3.

Figure 4:
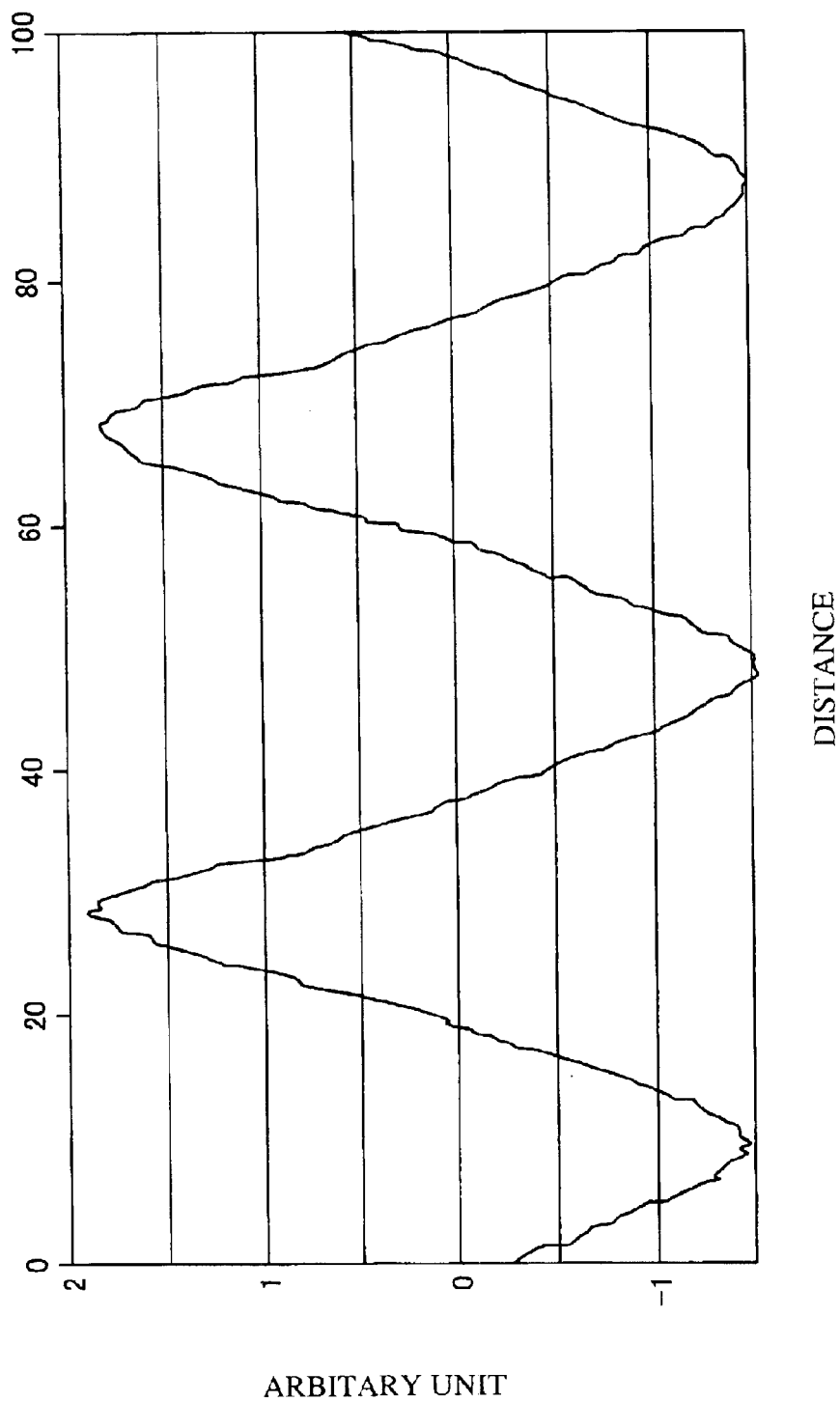
FIG. 4 is a graph showing the dielectric constant obtained by measuring the optical device in the direction of propagation of incident light.

The dielectric constant was measured over the ZnO layer 5 in the direction of propagation of incident light (in the width direction of the dielectric layers 3) using a dielectric constant detector. FIG. 4 shows that regions (second piezoelectric layer regions 2b) of the ZnO layer 5 on the dielectric layers 3 are negative c-planes and other regions (first piezoelectric layer regions 2a) of the Zno layer 5 on the substrate 1 are positive c-planes. In FIG. 4, positive values denote the positive c-planes and negative values denote the negative c-planes.

The convex portions 5a are removed by polishing to planarize the surface of the ZnO layer 5 to form the waveguide 2. The optical device according to preferred embodiments of the present invention is thus completed.

In the optical device, each first piezoelectric layer region 2a and each second piezoelectric layer region 2b having the opposite orientations are precisely adjacent to each other. When, for example, a red laser beam is incident on one end of the waveguide 2 having the first piezoelectric layer regions 2a and the second piezoelectric layer regions 2b, the red laser beam is converted into a blue laser beam, which is the second harmonic, and the blue laser beam is emitted from the other end.

According to the method for manufacturing the optical device according to preferred embodiments of the present invention, since the dielectric layers 3 are precisely formed at a reduced cost using a conventional lithography system, an optical device having greatly increased conversion efficiency is manufactured at a greatly reduced cost. Thus, the optical device according to preferred embodiments of the present invention functions as an excellent optical transducer for generating a second harmonic.

Figure 5:
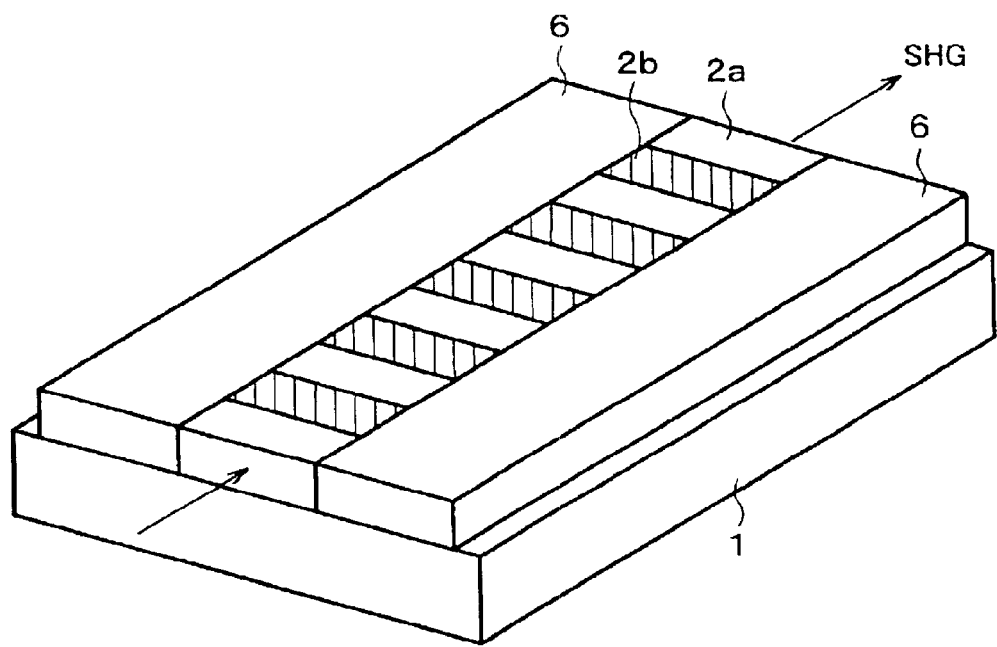
FIG. 5 is a perspective view of a modification of the optical device.

As shown in FIG. 5, for the optical device, a pair of clad layers 6 having a refractive index less than that of the waveguide 2 is provided by the ECR process at both sides of the waveguide 2 in the direction of propagation of incident light. Thus, the loss of light transmitted in the waveguide 2 is greatly reduced and the second harmonic conversion efficiency of the incident light is greatly increased.

As a result of studying the combination of the material of the substrate 1 and the material of the dielectric layers 3, the dielectric layers 3 preferably include $SiO_2$, SiO, SiN, TiN, $BaSiTiO_3$, $Al_2O_3$, TaN, $TiO_2$, or $Ta_2O_3$ when the substrate 1 includes c-plane sapphire, a-plane sapphire, m-plane sapphire, negative Z-plane $LiNbO_3$, or negative Z-plane $LiTaO_3$.

In contrast, the dielectric layers 3 preferably include $SiO_2$ or AlN when the substrate 1 includes $LiNbO_3$ other except for negative Z-plane $LiNbO_3$, except for negative Z-plane $LiTaO_3$, or glass, or quartz crystal.

While the present invention has been described with reference to what are at present considered to be the preferred embodiments, it is to be understood that various changes and modifications may be made thereto without departing from the invention in its broader aspects and therefore, it is intended that the appended claims cover all such changes and modifications that fall within the true spirit and scope of the invention.

What is claimed is:

1. An optical device comprising;

a substrate;

dielectric layers provided on portions of the substrate;

a piezoelectric layer provided on the substrate and the dielectric layers;

the piezoelectric layer having first regions directly disposed on the substrate and second regions disposed on the dielectric layers, the first and second regions being adjacent to each other; wherein the piezoelectric layer transmits incident light substantially parallel to the surface of the piezoelectric layer, the first regions have an axis orientation in a first direction caused by the substrate, the second regions have an axis orientation in a second direction caused by the dielectric layers, the first direction is different from the second direction.

2. The optical device according to claim 1, wherein the substrate includes at least one material selected from the group consisting of c-plane sapphire, a-plane sapphire, m-plane sapphire, negative Z-plane $LiNbO_3$, and negative Z-plane $LiTaO_3$, and the dielectric layers include at least one material selected from the group consisting of $SiO_2$, SiO, SiN, Tin, $BaSiTiO_3$, $Al_2O_3$, TaN, $TiO_2$ and $Ta_2O_3$.

3. The optical device according to claim 1, wherein the substrat includes at least one material selected from the group consisting of $LiNbO_3$ except for negative Z-plane $LiNbO_3$, $LiTaO_3$ except for negative Z-plane $LiTaO_3$, glass and quartz crystal, and the dielectric layers include at least one of $SiO_2$ and AlN.

4. The optical device according to claim 1, wherein the dielectric layers include one of ZnO, $LiNbO_3$, $LiTaO_3$, $KNbO_3$, $Ta_2O_3$, and AlN, arid the material of the dielectric layers is different from the substrate material.

5. The optical device according to claim 2, wherein the dielectric layers Include one of ZnO, $LiNbO_3$, $LiTaO_3$, $KNbO_3$, $Ta_2O_3$, and AlN, and the material of the dielectric layers is different from the substrate material.

6. The optical device according to claim 3, wherein the dielectric layers include one of ZnO, $LiNbO_3$, $LiTaO_3$, $KNbO_3$, $Ta_2O_3$, and AlN, and the material of the dielectric layers is different from the substrate material.

7. The optical device according to claim 1, wherein the dielectric layers each have a refractive index less than that of the piezoelectric layer.

8. The optical device according to claim 1, wherein the substrate has a refractive index less than that of the piezoelectric layer.

9. The optical device according to claim 1, wherein the first and second directions are opposite to each other.

10. The optical device according to claim 1, wherein the first and second directions are substantially perpendicular to the direction of propagation of incident light.

11. The optical device according to claim 1, wherein the first and second regions are arranged alternately and periodically in the direction of propagation of incident light.

12. The optical device according to claim 1, wherein the piezoelectric layer functions as a waveguide generating a second harmonic.

13. The optical device according to claim 1, wherein the piezoelectric layer has a flat surface.

* * * * *